(12) United States Patent
Bohler

(10) Patent No.: US 10,555,463 B2
(45) Date of Patent: Feb. 11, 2020

(54) METHOD FOR MAINTAINING SOIL MOISTURE FOR A GARDEN VIA A SUMP PUMP

(71) Applicant: Peter Bohler, Channahon, IL (US)

(72) Inventor: Peter Bohler, Channahon, IL (US)

(*) Notice: Subject to any disclaimer, the term of this patent is extended or adjusted under 35 U.S.C. 154(b) by 222 days.

(21) Appl. No.: 15/701,162

(22) Filed: Sep. 11, 2017

(65) Prior Publication Data
US 2018/0070543 A1    Mar. 15, 2018

Related U.S. Application Data

(60) Provisional application No. 62/495,436, filed on Sep. 14, 2016.

(51) Int. Cl.
| | |
|---|---|
| *A01G 25/16* | (2006.01) |
| *G01F 23/296* | (2006.01) |
| *B05B 12/08* | (2006.01) |
| *G01F 23/00* | (2006.01) |

(52) U.S. Cl.
CPC .......... *A01G 25/167* (2013.01); *B05B 12/085* (2013.01); *G01F 23/0007* (2013.01); *G01F 23/296* (2013.01)

(58) Field of Classification Search
CPC .. A01G 25/167; A01G 25/00; G01F 23/0007; G01F 23/296; B05B 12/085; B05B 15/10
USPC ............... 239/63, 64, 71, 73, 201, 203–207; 137/236.1, 565.37
See application file for complete search history.

(56) References Cited

U.S. PATENT DOCUMENTS

| | | | | |
|---|---|---|---|---|
| 7,207,748 B1* | 4/2007 | Urban | ................ | A01G 25/00 137/565.37 |
| 8,152,076 B2* | 4/2012 | Hewitt | ............... | E04D 13/0767 239/63 |
| 8,857,730 B2* | 10/2014 | Hartfelder | ............. | A01G 25/16 137/236.1 |

(Continued)

*Primary Examiner* — Steven J Ganey
(74) *Attorney, Agent, or Firm* — Donald Flaynik

(57) ABSTRACT

A method for maintaining soil moisture for a garden via a sump pump includes installing an irrigation sump pump in a sump pit; providing a water storage container; connecting a first conduit to the irrigation sump pump and the water storage container, the first conduit promotes water transfer from the sump pit to the water storage container; disposing at least one water distribution member at a predetermined area of a garden; connecting a second conduit to the water storage container and at least one water distribution member, the second conduit promotes water transfer from the water storage container to the one or more water distribution members; controlling the water level in the sump pit; controlling the water level in the water storage container from exceeding a predetermined high water level via an overflow pipe; installing at least one moisture measuring member or controller for determining a moisture content for at least one predetermined area of the garden; and distributing water upon a predetermined area of a garden when the moisture content is determined to be below a predetermined low moisture parameter, whereby water in the sump pit is distributed upon at least one predetermined area of the garden to increase soil moisture when the soil moisture level for the at least one predetermined area of the garden is determined to be below a predetermined low moisture parameter.

20 Claims, 3 Drawing Sheets

(56) References Cited

U.S. PATENT DOCUMENTS

2011/0114748 A1\* 5/2011 Boyajian ................ A01G 25/00
239/70

\* cited by examiner

METHOD FOR MAINTAINING SOIL MOISTURE FOR A GARDEN VIA A SUMP PUMP

This Utility Patent Application is based on Provisional Patent Application No. 62/495,436 filed on Sep. 14, 2016.

BACKGROUND OF THE INVENTION

Field of the Invention

The present invention relates to a method for using water in a sump pump pit to irrigate a garden, and more particularly, to a method for removing water from a sump pump pit and distributing the water upon predetermined portions of garden soil. The method includes an irrigation sump pump to remove water from a sump pit or sump well and dispose the water in a water storage container until the water is distributed upon garden soil having moisture levels below acceptable predetermined parameters. The method further includes a high water level sump pump to transfer water from the sump pit to a storm water drain when water flow rate into the sump pit is greater than the pumping rate of the irrigation pump, thereby preventing water from overflowing the sump pit and flooding the surrounding area.

Background of the Prior Art

Sump pumps disposed in sump pits are common in basements of homes. The sump pit receives water collected via field tiles under the concrete floor of the basement. The collected is ultimately disposed in a sump pit, whereupon, a sump pump removes the water from the sump pit and into a pipe that directs the water into a storm water conduit or similar rain water collection system. The water in the sump pit is generally clean water and can be used for a myriad of functions, including but not limited to irrigating gardens, and washing decks and concrete surfaces. However, the priority for sump pump operation is to remove sufficient quantities of water from the sump pit that prevents water from overflowing the sump pit and covering the basement floor, requiring that the operation and piping for the sump pump remain unchanged.

To remove water from the sump pit for irrigation and/or cleaning purposes, a second sump pump or irrigation sump pump having substantially less water volume pumping capability than the existing or primary sump pump is installed in the sump pit, such that the smaller irrigation sump pump is energized before the primary sump pump as the water rises in the sump pit, resulting in the removal of water from the sump pit and the disposition of the water in a container; whereupon, the water in the container is ultimately disposed upon soil having a moisture content below a predetermined number or parameter. Further, to prevent electrical injury to a person in contact with the irrigation sump pump system, a 12 V.D.C. operating system that includes a 120 V.A.C. to 12 V.D.C. power supply, 12 V.D.C. irrigation sump pump and 12 V.D.C. control equipment is used. To maintain the operation of the irrigation sump pump system during power outages, one or more 12 V.D.C. car batteries are used to "back-up" the 120 V.A.C. to 12 V.D.C. power supply to power the irrigation sump pump system for at least twenty-four hours after losing the 120 V.A.C. power feed to the house.

The primary sump pump is generally a one-half horse power pump rated at 120 V.A.C., but can be as large as two horsepower with a voltage rating of 120 V.A.C. To maintain operation of the primary sump pump during a power outage, the quantity of 12 V.D.C. car batteries can be increased to power the primary sump pump for a predetermined time period. To enable the car batteries to power the primary sump pump, an inverter is required to convert the 12 V.D.C. power supplied by the car batteries to 120 V.A.C. required by the primary sump pump.

SUMMARY OF THE INVENTION

It is an object of the present invention to overcome many of the disadvantages associated with prior art sump pump systems that remove water from a sump pit. A principal object of the present invention is to install a second sump pump in a sump pit to remove water from the sump pit for uses that include but not limited to irrigation and cleaning. A feature of the present invention is to maintain an existing sump pump system to prevent a water level in the sump pit from overflowing the sump pit. Another feature of the present invention is to energize the second sump to remove water from the sump pit before the existing sump pump is energized. Still another feature of the present invention is to energize the existing sump pump when a predetermined high water level in the sump pit is attained. An advantage of the present invention is that the second sump pump can discharge water from the sump pit to a water storage container, thereby providing water for irrigation and cleaning when the water is required. Another advantage of the present invention is that the existing sump pump only needs to discharge water from the sump pit to a storm water drain when water flow into the sump pit exceeds the water discharge capability of the second sump pump, such that the high water level in the sump pit is attained.

Another object of the present invention is to provide a water level control system in the sump pit for starting and stopping the second sump pump disposed in the sump pit. A feature of the sump pit level control system is a level controller that determines water level in the sump pit via a probe (direct water contact) or a sonic sensor disposed above the water level and above the sump pit. Another feature of the level control system is an internal relay for starting and stopping the second sump pump at predetermined water levels inside the sump pit. An advantage of the level control system is that the water levels inside the sump pit that start and stop the second sump pump are adjustable.

Another object of the present invention is to provide a water level control system for water disposed in the water storage container. A feature of the water storage container level control system is a level controller that determines water level in the container via a probe inserted and extending into the container past a predetermined low water level. Another feature of the storage container level control system is an internal relay for energizing and de-energizing a first solenoid valve that allows water flow from a gutter spout into the water storage container; an internal relay for energizing and de-energizing a second solenoid valve that allows water flow from the second sump pump to the water storage container; an internal relay for energizing a low water level alarm light for the water storage container; and an internal relay for allowing the second sump pump to start when the water level in the water storage container is below a predetermined low water level. An advantage of the water storage container level control system is that the water levels, which cause the control system to energize and de-energize respective relays, can vary by adjusting set point programming in the level control system.

Yet another object of the present invention is to provide a water distribution system from the water storage container to a predetermined portion of soil having low moisture content. A feature of the water distribution system is moisture measuring member that in contact with a predetermined portion of soil. Another feature of the water distribution system is a water distribution member disposed above a predetermined portion of soil. Still another feature of the water distribution system is a water distribution solenoid valve that is energized and de-energized by the moisture measuring member such that when a predetermined portion of of soil has a moisture content below a predetermined number or parameter, the solenoid valve is energized, thereby allowing water to flow from the water storage container, via "head pressure" resulting from water level and gravity, to and through the water distribution member for ultimate distribution upon the low moisture soil. An advantage of the water distribution system is that a myriad of water distribution members can be supplied with water from the water storage container via one solenoid valve and one moisture measuring member, or a combination of multiple solenoid valves and multiple moisture measuring members.

Briefly, the invention provides a method for maintaining soil moisture for a garden via a sump pump, the method includes the steps of:

installing an irrigation sump pump in a sump pit;

providing a water storage container;

connecting a first conduit to the irrigation sump pump and the water storage container, the first conduit promoting water transfer from the sump pit to the water storage container;

disposing at least one water distribution member at a predetermined area of a garden;

connecting a second conduit to the water storage container and the at least one water distribution member, the second conduit promoting water transfer from the water storage container to the at least one water distribution members;

controlling the water level in the sump pit;

controlling the high water level in the water storage device;

determining moisture level for at least one predetermined area of the garden; and distributing water upon a predetermined area of a garden when the moisture content is measured to be lower than a predetermined moisture parameter, whereby water in a sump pit is distributed upon at least one predetermined area of the garden to increase soil moisture when a soil moisture parameter for the at least one predetermined area of the garden is determined to be below a predetermined low limit parameter.

BRIEF DESCRIPTION OF THE DRAWINGS

The foregoing invention and its advantages may be readily appreciated from the following detailed description of the preferred embodiment, when read in conjunction with the accompanying drawings in which.

DESCRIPTION OF THE PREFERRED EMBODIMENT

Figure 1:
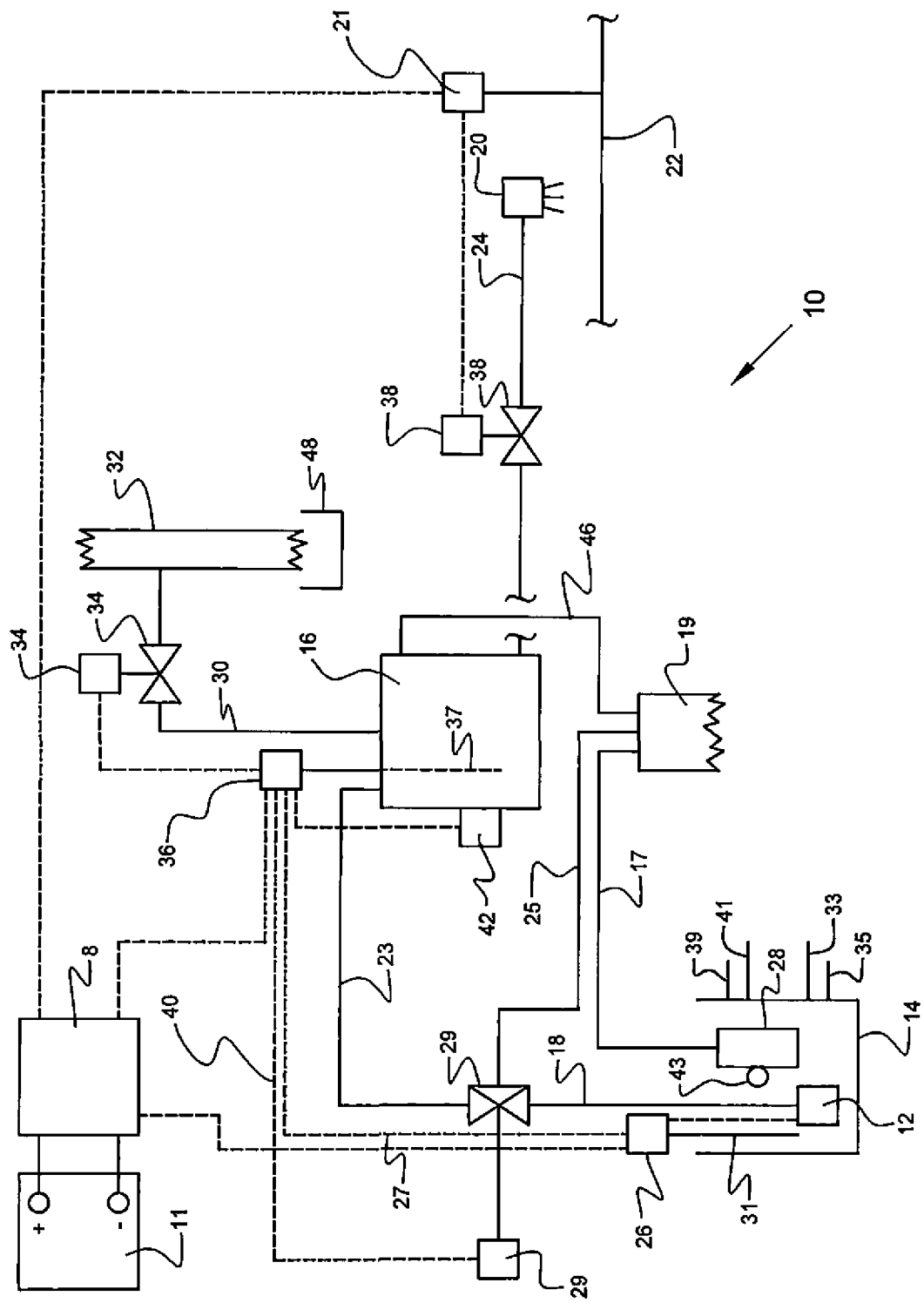
FIG. 1 is a plan view of a method for maintaining soil moisture for a garden via a sump pump in accordance with the present invention.

Referring now to the drawings, a method for maintaining soil moisture for a garden via a sump pump in accordance with the present invention is denoted as numeral 10. The method 10 includes installing a second sump pump or an irrigation sump pump 12 in a sump pit 14; providing a water storage container 16; connecting a first conduit 18 to the irrigation sump pump 12 and the water storage container 16, the first conduit 18 promotes water transfer from the sump pit 14 to the water storage container 16; disposing at least one water distribution member 20 at a predetermined area of a garden 22; connecting a second conduit 24 to the water storage container 16 and at least one water distribution member 20, the second conduit 24 promotes water transfer from the water storage container 16 to the one or more water distribution members 20; controlling the water level in the sump pit 14; controlling the water level in the water storage container 16 from exceeding a predetermined high water level; installing at least one moisture measuring member or controller 21 for determining a moisture content for at least one predetermined area of the garden 22; and distributing water upon a predetermined area of a garden 22 when the moisture content is determined to be low, whereby water in the sump pit 14 is distributed upon at least one predetermined area of the garden 22 to increase soil moisture when the soil moisture level for the at least one predetermined area of the garden 22 is determined to be below a predetermined low limit parameter.

The sump pit 14 typically includes a cylindrical configuration, substantially two feet in diameter and substantially two feet deep with a steel cylindrical wall and a concrete floor. The sump pit 14 receives a first level controller 26 for controlling the operation of the irrigation sump pump 12. The irrigation sump pump 12 is manufactured by Pentair, model number Shurflow 4008 and is substantially about a one-eighth horsepower motor. The first level sensor or controller 26 is manufactured by Arduino, model UNO. The level controller 26 includes a probe 31 or similar sensor inserted into the sump pit 14 that senses water level within the sump pit 14. The level controller 26 is secured at a position proximate to the sump pit 14 to enable the probe to be connected to the first level controller 26. The first level controller probe 31 is vertically inserted into the sump pit 14 until the bottom of the probe 31 is substantially about two inches above the bottom of the sump pit 14. An acceptable alternative to the probe 31 for detecting water level in the pit 14 is an ultrasonic sensor (not depicted) placed above a maximum high water attained by the water in the pit 14. The ultrasonic sensor is well known to those of ordinary skill in the art. Irrespective of the probe 31 or ultrasonic sensor being used with the controller 26, the controller 26 is capable of starting and/or stopping the irrigation sump pump 12 and providing irrigation sump pump 12 running alarms. Further, the controller 26 provides alarms for selected high and/or low water levels in the sump pit 14; and when a WIFI modem (not depicted) is interfaced with the level controller 26, the sump pit 14 high and/or low water level alarms and the irrigation sump pump 12 running alarms can be communicated to an individual via text messages, phone calls and/or email.

The first level controller 26 can be energized by a 120 V.A.C. power source, but low voltage power source is preferred such as a 12 V.D.C. automotive battery 8 that is constantly charged by a 120 V.A.C. to 12 V.D.C. power converter 11, thereby promoting safety and preventing electric shock and injury to persons contacting any portion of the electrical components while engaging water. The first level controller 26 is programmed to energize or start the irrigation sump pump 12 when a predetermined first high water level 33 is measured by the controller 26 in the sump pit 14. The irrigation sump pump 12 continues running, thereby draining the sump pit 14, until a predetermined first low water level 35 that has been programmed into the first level controller 26 is measured by the controller 26, whereupon, the irrigation sump pump 12 is de-energized or stopped by the controller 26. In the event that the water flow incoming into the sump pit 14 is greater than the irrigation sump pump 12 can remove from the sump pit 14, a high water level sump pump 28 is disposed in the sump pit 14 such that the high water level sump pump 28 is energized by a predetermined second high water level 39 that is higher in elevation in the sump pit 14 than the first high water level 33.

Further, the high water level sump pump 28 continues running until the water level in the sump pit 14 is lowered to a predetermined second low water level 41 that is higher in elevation than the first high water level 33 that starts the irrigation sump pump 12, thereby causing the irrigation sump pump 12 to be the primary running pump when water enters the sump pit 14 and allowing the high level sump pump 28 to start only when the water volume entering the sump pit 14 is greater than the volume that the irrigation sump pump 12 can pump. Although the first level controller 26 can be programmed to start and stop both the irrigation sump pump 12 and the high water level sump pump 28 at predetermined water levels in the sump pit 14; a second level controller 43 is preferred to start (energize) and stop (de-energize) the high water level sump pump 28 at predetermined high and low water levels 39 and 41 in the sump pit 14. The preferred second level controller 43 or method for energizing the high water level sump pump 28 is to provide an independent 120 V.A.C. power source to the sump pump 28 with two float switches 43 secured to the sump pump 28 to start and stop the sump pump 28 at the predetermined second high and second low water levels 39 and 41. The 120 V.A.C. high water level sump pump 28 with float switches is a standard for draining sump pits 14 and is well known to those of ordinary skill in the art.

The predetermined first high and first low water levels 33 and 35 cooperate to start and stop the irrigation sump pump 12 to control the water level in the sump pit 14 without starting the high water level sump pump 28. However, when the water flow into the sump pit 14 is greater than the water pumping capacity of the irrigation sump pump 12, the predetermined second high and second low water levels cooperate to start and stop the high water level sump pump 28 such that both sump pumps 12 and 28 are energized when the water level in the sump pit 14 reaches the second high water level. The high water level sump pump 28 is de-energized when the water level in the sump pit 14 is lowered to the second law water level 41. The irrigation sump pump 12 is de-energized when the first low water level 35 is reached, resulting in both the high water level sump pump 28 and the irrigation sump pump 12 being de-energized, thereby allowing water to accumulate and increase in elevation in the sump pit 14. When the first high water level 33 is reached, the irrigation sump pump 12 is energized and the high water level sump pump 28 remains de-energized. The irrigation sump pump 12 continues running until the water level in the sump pit 14 is lowered to the first low water level 35 irrespective of the high water level sump pump 28 running. If the water volume flow into the sump pit 14 is greater than the volume the irrigation sump pump 12 can discharge from the sump pit 14, the irrigation sump pump 12 will constantly run and the high water level sump pump 28 will control the water level in the sump pit 14, unless the water volume flow into the sump pit 14 is greater than the water volume the high water level pump 28 can discharge from the pit 14, resulting in water overflowing the sump pit 14 and flooding the area surrounding sump pit 14.

The discharged water from the high water level sump pump 28 flows through a pipe 17, connected to the high water level sump pump 28, and into a drain 19 disposed proximate to the sump pit 14. The discharged water from the irrigation sump pump 12, operated by the first level controller 26, flows through the first conduit or pipe 18 (which includes a check valve (not depicted) for preventing water backflow from the water storage container 16 into the sump pit 14 via the irrigation sump pump 12) and ultimately flows into the water storage container 16 via container pipe 23 or the water drain 19 via drain pipe 25. The water flow from the irrigation sump pump 12 is directed to the water storage container 16 or the water drain 19 by the position of a "three-way" 12 V.D.C. first solenoid valve 29, which is energized for water flow to the container 16 and de-energized for water flow to the drain pipe 25. The operation of the first solenoid valve 29 is controlled by a 12 V.D.C. third level controller 36 (via first solenoid wires 40) after the third water level controller 36 determines that a low water level in the water storage container 16 is present. The third level controller 36 is manufactured by the same company and has the same model number as the first level controller 26.

The third level controller 36 determines the water level in the storage container 16 via a probe 37 or other water sensing means well known to those of ordinary skill in the art. The water sensing means for the third level controller 36 is inserted into the container 16 to a depth corresponding to a predetermined low water level in the container 16 that is to be maintained to promote sufficient water flow from the container 16 to irrigate a garden or lawn 22. When the third level controller 36 determines that a water level in the container 16 is below a predetermined high water level set-point, the third level controller 36 directs power via solenoid wires 40 connected to the first solenoid valve 29 to energize the valve 29 such that the valve 29 prevents water flow to the drain 19 and allows water flow to the water storage container 16.

Further, when the water level in the container 16 is below a set-point low water level, the third level controller 36 causes a 12 V.D.C. warning light 42 on the water storage container 16 to illuminate, and enables the irrigation sump pump 12 to start (via wires 27 connected to the first and third level controller 26 and 36) if the water level in the sump pit 14 is above the predetermined first low water level set-point 35 for the irrigation sump pump 12. The predetermined first low water level 35 is programmed into the first level controller 26, which prevents the irrigation sump pump 12 from operating when the first level controller 26 senses a water level in the sump pit 14 below the predetermined set-point for the first low water level 35. The third level controller 36 will start the irrigation sump pump 12 only when the water level in the sump pit 14 is above the first low water level 35 and below the first high water level 33, thereby enabling the irrigation sump pump 12 to direct water to the container 16 when the water level in the sump pit 14 does not increase to the first high water level 33 during weather conditions that cause low water flow quantities into the sump pit 14.

The conduit 18 is typically fabricated from PVC pipe and includes a one inch diameter, but alternative pipe materials can be used with a larger diameter all being well known to those of ordinary skill in the art. The water storage container 16 or drum is constructed from PVC and can have a volume range between twenty and fifty-five gallons. The water storage container 16 is disposed proximate to a building (not depicted) containing the sump pit 14, such that the water storage container 16 receives water from a third conduit 30 connected to a gutter downspout 32 for the roof of the building containing the sump pit 14; rainwater from the gutter downspout 32 is ultimately directed to a rainwater discharge area or rainwater conduit 48. Rainwater continuously flows through the gutter downspout 32, but rainwater can flow through the third conduit 30 only when a manually operated second valve 34 in the third conduit 30 is manually disposed in an open position, thereby allowing rainwater to flow from the gutter downspout, through the third conduit 30 and into the water storage container 16. Alternatively, the second valve 34 can be a 12 V.D.C. solenoid valve that is energized to open by the third level controller 36 when a predetermined low water level in the container 16 is sensed by the controller 36. The second solenoid valve 34 can be energized via a water level in the container 16 that is less than the high water set point for the container 16, or the second solenoid valve 34 can be energized by a water level in the container 16 that causes a low level light 42 to energize. When the low water level light 42 is energized and the sum pit 14 water level is below the first low water level 35 set point, the water storage container 16 should be manually filled with water to the container's 16 high water level set point.

The water distribution members 20 are manufactured by Jim Eagle, model number ¾ inch PVC-EverPex. The water moisture measuring controllers 21 are manufactured by Phantom YoYo, model number SEN-13322. One or more water distribution members 20 are disposed at predetermined areas of a garden 22 to provide a water spray upon the corresponding area of the garden 22. A corresponding one or more water moisture measuring controllers 21 are disposed proximate to the water distribution members 20, such that when a low water moisture limit or condition parameter is sensed by the moisture measuring controller 21, which is energized by a 12 V.D.C. power source, the controller 21 generates an electronic signal that indicates or otherwise corresponds to the moisture content of the predetermined area of the garden 22, resulting in the energizing of a 12 V.D.C. third solenoid valve 38 installed in the second conduit 24, thereby allowing water flow from the water storage container 16 (via water head pressure from the water level in the container 16), through the second conduit 24, through a nozzle of the water distribution member 20 and upon the predetermined area of the garden 22.

The third solenoid valve(s) 38 are de-energized when the moisture content of the corresponding predetermined area of the garden 22 is determined to be sufficient. When more than one water distribution member 20 (with a corresponding moisture measuring controller 21 adjacent to the member 20) is disposed upon more than one predetermined area of the garden 22, then multiple second conduits 24 with corresponding third solenoid valves 38 in each second conduit 24 connects the water storage container 16 to each water distribution member 20, thereby maintaining a predetermined moisture content throughout the garden 22.

In operation, the water level in the sump pit 14 is controlled by energizing the irrigation sump pump 12 when a first high water level 33 is sensed or measured in the sump pit 14; energizing a high level sump pump 28 when a second high water level 39 is sensed in the sump pit 14; de-energizing the high level sump pump 28 when a second low water level 41 is measured in the sump pit 14; and de-energizing the irrigation sump pump 12 when a first low water level 35 is measured in the sump pit 14, whereby the irrigation sump pump 12 starts when water level in the sump pit 14 reaches a predetermined first high level 33, and the irrigation sump pump 12 continues running until the water level in the sump pit 14 drops to a predetermined first low level 35. Further, the high level sump pump 28 starts when the water level in the sump pit 14 reaches a predetermined second high level 39, and the high level sump pump 28 continues running until the water level drops to the predetermined second low level 41. The irrigation sump pump 12 only stops running when the water level in the sump pit 14 drops to the predetermined first low level 35.

In operation, the water level in the water storage device 16 is controlled by the irrigation sump pump 12 when the water level in the water storage container 16 is at or below a predetermined low water level condition, and when the water level in the sump pit 14 is above a first low water level 35. Alternatively, the water storage container 16 can be filled by connecting a third pipe 30 to a gutter downspout 32 and to the container 16 with a manually operated shutoff valve in the pipe line 30; or the water storage container 16 can be filled by replacing the manually shutoff valve with a second solenoid valve 34 that can be energized to open by the third level controller 36 when the controller 36 senses a water level in the container 16 below the predetermined low water level condition, thereby allowing rain water flowing down the downspout 32 to flow directly into the container 16. Irrespective of the method used to fill the water storage device 16, an overflow pipe 46 is connected to a top portion of the container 16 to allow rising water in the container 16 to flow from the container 16 and into the storm water drain pipe 19.

Figure 2:
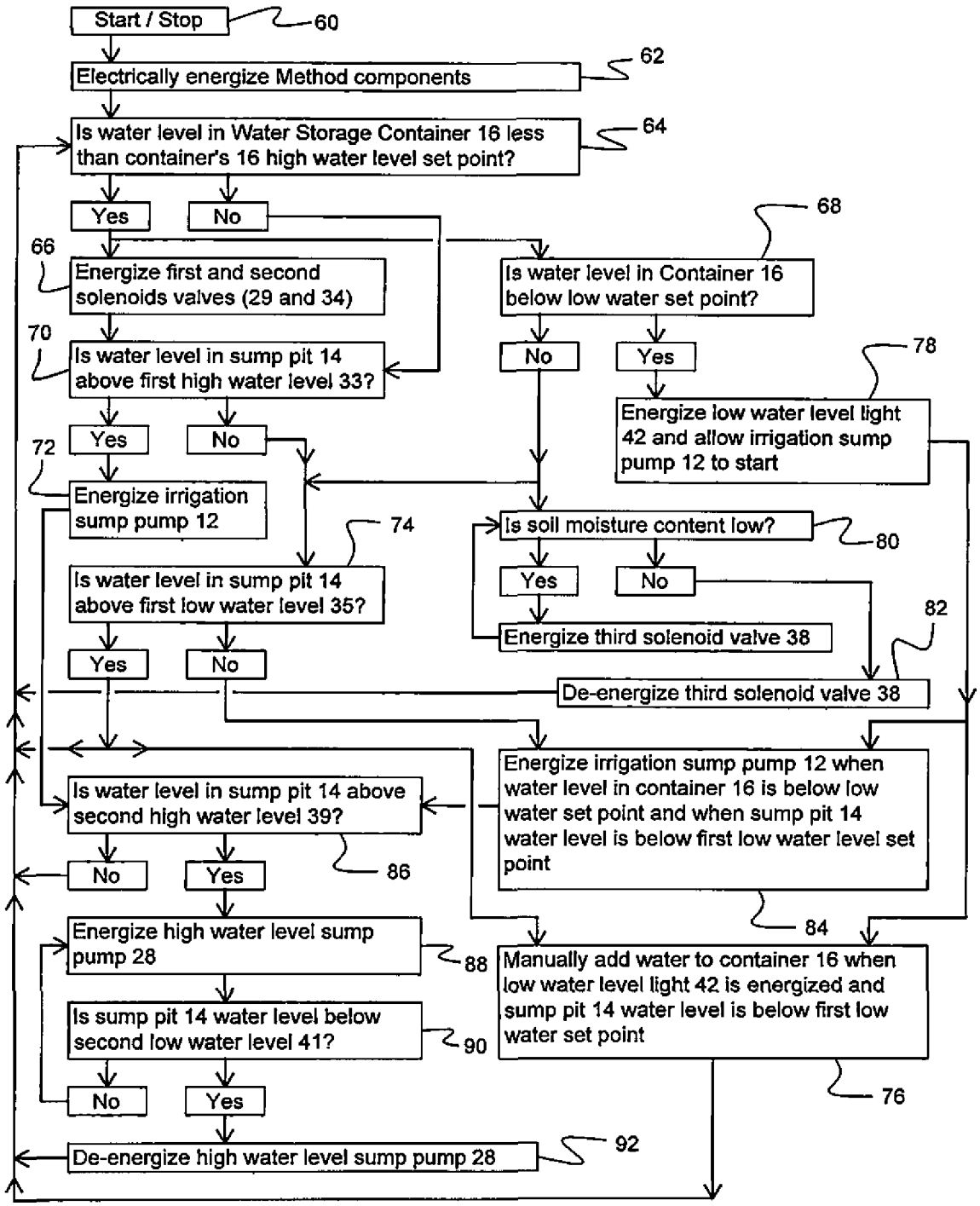
FIG. 2 is a flow chart for the method of FIG. 1.
Figure 3:
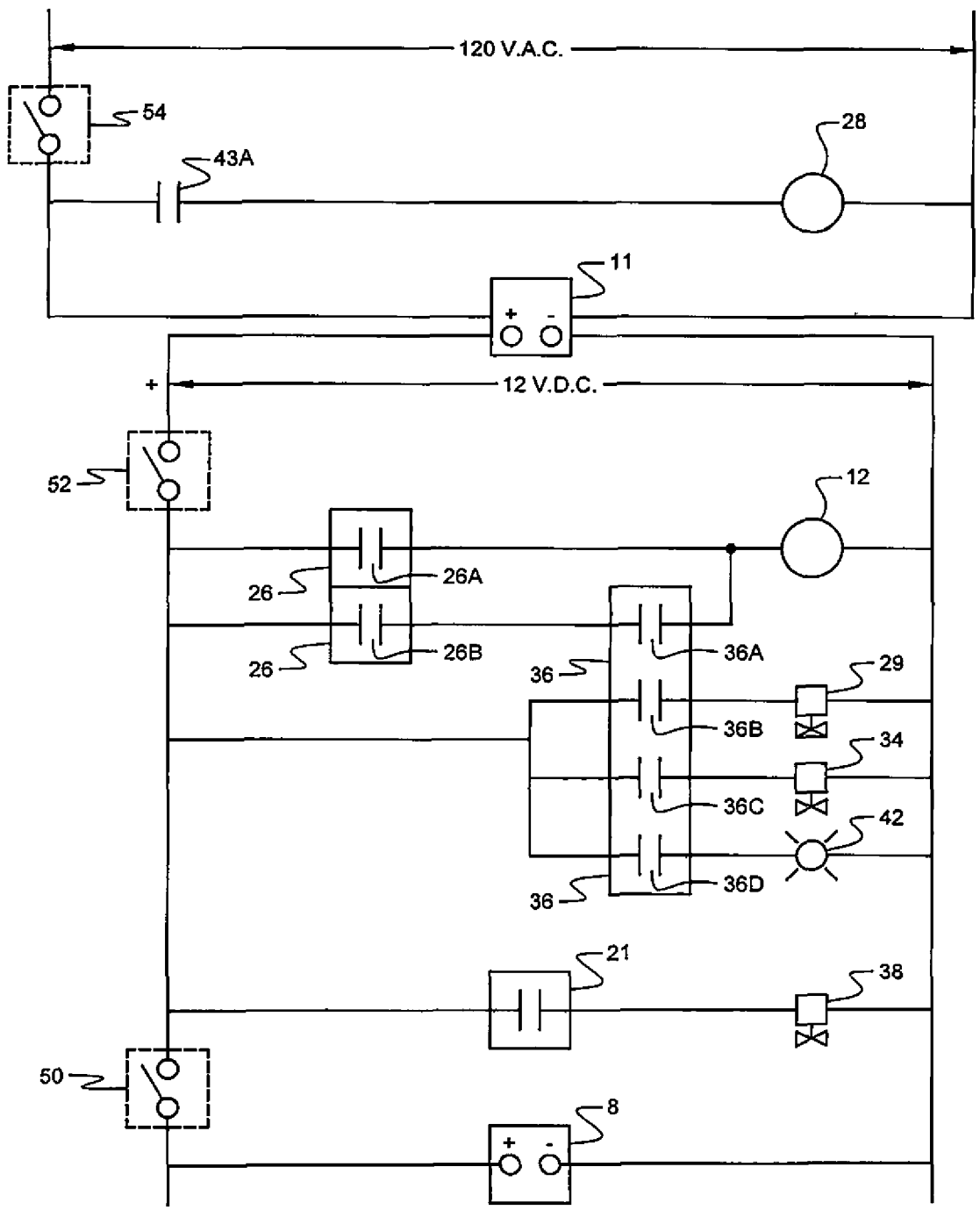
FIG. 3 is an electrical schematic diagram for the method of FIG. 1.

Referring now to FIG. 2, a process flow chart for a method for maintaining soil moisture for a garden via a sump pump is depicted. The method 10 is initiated by manually placing a start-stop switch in a position (box 60) that electrically energizes all components (box 62). The method initially determines if the water level in the water storage container 16 is less than the container's 16 predetermined high water level set point (box 64). If the water level in the water storage container 16 is less than the high water level set point, the third level controller 36 closes internal contacts 36 B and 36 C (see FIG. 3), resulting in the energizing of three-way first solenoid valve 29 and two way second solenoid valve 34, respectively (box 66). Energizing the three-way solenoid valve 29 causes water discharged from the sump pit 14 via the irrigation sump pump 12 to flow through the valve 29 and into the water storage container 16. Energizing the two-way valve 34 causes water to flow from the gutter down spout 32, if rain conditions exist, through the valve 34 and into the water storage container 16. Further, concurrently with the energizing of the solenoid valves 29 and 34, the method determines if the water level in the container 16 is below a predetermined low water level set point (box 68).

Referring back to box 66, after energizing the solenoid valves 29 and 34, the method 10 determines if the water level in the sump pit 14 is above a predetermined first high water level 33 (box 70). If the water level in the sump pit 14 is above the first high water level 33, then the sump pump 12 is energized (box 72) by first level controller 26 causing internal contacts 26 A to close (see FIG. 3). Referring back to box 64, if the water level in the water storage container 16 is more than the container high water level set point, the method keeps solenoid valves 29 and 34 de-energized, resulting in water discharged from the solenoid valve 29 being disposed in the storm water drain 19, and the prevention of water flow from the gutter down spout 32 to the water storage container 16, but pursuant to boxes 70 and 72, if the water level in the sump pit 14 is above the first high water level 33, the irrigation sump pump 12 will energize.

If the water level in the sump pit 14 is not above the first high water level 33 (box 70), but if the water level is above a predetermined first low water level 35 (box 74), then the method 10 returns to box 64 and simultaneously proceeds to box 76, which calls for the manual adding of water to the container 16 after a low water level light 42 has been energized via third level controller 36 closing internal contacts 36 D (see FIG. 3) and the first controller 26 closing internal contacts 26 B (FIG. 3) pursuant to box 78, which follows the low water level condition in the water storage container 16 of box 68. The method then returns to box 64 for determination of the water level in the water storage container 16 being less than the container's 16 high water level set point.

Returning to box 68, if the water level in the container 16 is above the predetermined low water set point, then the method 10 determines if the soil moisture for a predetermined portion of soil is below a predetermined moisture number or moisture parameter (box 80). If the moisture measuring member 21 determines that a the predetermined portion of soil and/or garden area has a low moisture content, the moisture measuring member 21 energizes a third solenoid valve 38, thereby allowing water to flow from the water storage container 16 to and through one or more water distribution members 20, whereupon, the water is discharged upon predetermined portions of soil and/or garden area 22. When the moisture content of the predetermined portion of soil and/or garden area has matched or exceeded the moisture measuring member 21 set point, the moisture measuring member 21 de-energizes the third solenoid valve 38 (box 82) and the method 10 returns to box 64 and determines if the water level in the water storage container 16 is less than the container's 16 predetermined high water level set point.

Returning to box 74, if the water level in the sump pit 14 is below the predetermined first low water level 35, and the water level in the water level storage container 16 is below the predetermined low water set point (box 68), then internal contacts 26 B of the first level controller 26 and internal contacts 36 A of the third level controller 36 cooperate to energize the irrigation sump pump 12 (box 84). Irrespective of the irrigation sump pump 12 being energized pursuant to box 84 or box 72, the method 10 determines next if the water level in the sump pit 14 is above a predetermined second high water level 39 (box 86). If the water level in the sump pit 14 is below the second high water level 39, the method 10 returns to box 64 and determines if the water level in the water storage container 16 is less than the container's 16 predetermined high water level set point. If the water level in the sump pit 14 is at or above the second high water level 39, a second level controller 43 via closed internal contacts 43 A (see FIG. 3) energize the high water level sump pump 28 (box 88), thereby lowering the water level in the sump pit 14. When the second level controller 43 determines that the sump pit 14 water level is below the second low water level 41 (box 90), the internal contacts 43 A open and the high water level sump pump 28 is de-energized (box 92), whereupon, the method 10 returns to box 64 and determines if the water level in the water storage container 16 is less than the container's 16 predetermined high water level set point. The method 10 continues as provided in the blocks until the start/stop switches 50 and 52 (see FIG. 3) are manually positioned in a stop position, thereby removing the 12 V.D.C. power source from the controllers 26 and 36, solenoid valves 29, 34 and 38, irrigation sump pump 12 and the moisture measuring member 21. However, the 120 V.A.C. power to the second level controller 43, high water level sump pump 28 and power supply 11 remains connected until a power switch 54 is manually disposed in an off or disconnect position (see FIG. 3).

The foregoing description is for the purpose of illustration only and is not intended to limit the scope of protection accorded this invention. The scope of protection is to be measured by the following claims, which should be interpreted as broadly as the inventive contribution permits.

The invention claimed is:

1. A method for maintaining soil moisture for a garden via a sump pump, said method comprising the steps of:
   installing an irrigation sump pump in a sump pit;
   providing a water storage container;
   connecting a first conduit to said irrigation sump pump and said water storage container, said first conduit promoting water transfer from said sump pit to said water storage container;
   disposing at least one water distribution member at a predetermined area of a garden;
   connecting a second conduit to said water storage container and said at least one water distribution member, said second conduit promoting water transfer from said water storage container to said at least one water distribution members;
   controlling the water level in said sump pit;
   controlling the high water level in said water storage container;
   determining moisture level for at least one predetermined area of the garden; and
   distributing water upon the at least one predetermined area of the garden when the moisture content is measured to be lower than a predetermined moisture parameter, whereby water in said sump pit is distributed upon the at least one predetermined area of the garden to increase soil moisture when a soil moisture parameter for the at least one predetermined area of the garden is determined to be below a predetermined low limit parameter.

2. The method of claim 1 wherein said step of installing an irrigation sump pump in a sump pit includes the step of controlling the operation of said irrigation sump pump.

3. The method of claim 2 wherein said step of controlling the operation of said irrigation sump pump includes the step of installing a first level sensor proximate to said irrigation sump pit for starting and stopping said irrigation sump pump.

4. The method of claim 3 wherein said step of installing a first level sensor includes the steps of sensing a first high water level in said sump pit and sensing a first low water level in said sump pit, said first high water level being higher in elevation in said sump pit than said first low water level in said sump pit.

5. The method of claim 4 wherein said step of sensing a first upper water level in said sump pit includes the step of enabling the start of said irrigation sump pump.

6. The method of claim 4 wherein said step of sensing a first lower water level in said sump pit includes the step of stopping said irrigation sump pump.

7. The method of claim 2 wherein said step of controlling the operation of said irrigation sump pump includes the step of installing a third level controller proximate to said water storage container for enabling the start of said irrigation sump pump when the water level in the container is below a predetermined low water level, said third level controller causing a warning light on said water storage container to illuminate when the water level in said water storage container is below said predetermined low water level, said third level controller causing said irrigation sump pump to energize when the water level in the sump pit is above said predetermined first low water level for said irrigation sump pump.

8. The method of claim 7 wherein said step of installing a third level controller includes the step of sensing an upper water level in said water storage container for de-energizing a first solenoid valve, thereby preventing water flow to said water storage container and directing water flow from said irrigation sump pump to a storm water drain.

9. The method of claim 1 wherein said step of installing an irrigation sump pump in a sump pit includes the step of installing a high-level sump pump in said sump pit.

10. The method of claim 9 wherein said step of installing a high-level sump pump in said sump pit includes the step of controlling the operation of said high-level sump pump.

11. The method of claim 10 wherein said step of controlling the operation of said high-level sump pump includes the step of installing a second level sensor for starting and stopping said high- level sump pump.

12. The method of claim 11 wherein said step of installing a second level sensor includes the steps of sensing a second high water level in said sump pit and sensing a second low water level in said sump pit.

13. The method of claim 12 wherein said step of sensing a second high water level in said sump pit includes the step of starting said high-level sump pump, said second high water level being higher in elevation in said sump pit than said first high water level in said sump pit.

14. The method of claim 13 wherein said step of sensing a second low water level in said sump pit includes the step of stopping said high-level sump pump, said second low water level being higher in elevation in said sump pit than said first high water level in said sump pit.

15. The method of claim 1 wherein said step of connecting a second conduit to said water storage container and said at least one water distribution member includes the step of installing a third solenoid valve in said second conduit, said third solenoid valve being energized by a moisture measuring member and controller, thereby allowing water to flow from said water storage container to a water distribution member in said second conduit and upon a preselected ground area having low moisture content.

16. The method of claim 1 wherein said step of controlling the water level is said sump pit comprises the steps of:
energizing said irrigation sump pump when a first high water level is sensed in said sump pit;
energizing a high level sump pump when a second high water level is sensed in said sump pit;
de-energizing said high level sump pump when a second low water level is sensed in said sump pit; and
de-energizing said irrigation sump pump when a first low water level is sensed in said sump pit, whereby said irrigation sump pump starts when water level in the sump pit reaches a predetermined first high water level, said irrigation sump pump continues running until the water level in the sump pit drops to a predetermined first low water level, said high level sump pump starting when the water level in the sump pit reaches a predetermined second high water level, said high level sump pump and said irrigation sump pump run concurrently until the water level drops to said predetermined second low level, whereupon, said high level sump pumps stop running and said irrigation sump pump continues to run until the water level in said sump pit drops to said first low water level.

17. The method of claim 1 wherein said step of controlling the high water level in said water storage container comprises the steps of:
enabling said irrigation sump pump to start when the water level in said water storage container is below a predetermined high level;
starting said irrigation sump pump when the water level in the sump pit is above a predetermined first high level; and
de-energizing a first solenoid valve when the water level in said water storage container reaches a predetermined high level, thereby preventing water flow from said irrigation sump pump into said water storage container and allowing water flow from said irrigation sump pump into a storm water drain.

18. The method of claim 1 wherein said step of determining moisture level for at least one predetermined area of the garden includes the step of installing moisture detectors in at least one predetermined area of the garden, said at least one moisture detector generating an electronic signal that indicates the moisture content of the predetermined area of the garden.

19. The method of claim 1 wherein said step of distributing water upon a predetermined area of a garden when the moisture content is determined to be below a predetermined low limit parameter includes the step of providing a moisture measuring member and controller that ultimately energizes a third solenoid valve that allows water flow to a nozzle that distributes water upon the at least one predetermined area of the garden having the low moisture content parameter, said third solenoid valve being de-energized when the moisture content of the at least one predetermined area of the garden is determined to be above the predetermined low limit parameter.

20. The method of claim 1 wherein said step of controlling the high water level in said water storage container comprises the steps of:
installing a second solenoid valve in a third conduit and energizing said second solenoid valve to open when a third level controller proximate to said water storage container senses a water level below a predetermined high water level in said water storage container, thereby allowing rain water to flow from a gutter downspout and into said water storage container;
enabling said irrigation sump pump to start when the water level in said water storage container is below a predetermined high water level;
starting said irrigation sump pump when the water level in the sump pit is above a predetermined first low water level; and
energizing a first solenoid valve when the water level in said water storage device is below a predetermined high level, thereby directing water from said irrigation sump pump to said water storage container; whereby said water storage container is filled simultaneously with water from said irrigation sump pump, and with rainwater flowing off the roof of the building that houses the sump pit, through said gutter downspout, through said third conduit and into said water storage container until filling said water storage container, whereupon, said third level controller de-energizes said first and second solenoid valves, thereby stopping all water flow into said water storage container.

* * * * *